(12) United States Patent
Castinado et al.

(10) Patent No.: US 11,792,009 B2
(45) Date of Patent: *Oct. 17, 2023

(54) ELECTRONIC SYSTEM FOR GENERATION OF AUTHENTICATION TOKENS USING BIOMETRIC DATA

(71) Applicant: BANK OF AMERICA CORPORATION, Charlotte, NC (US)

(72) Inventors: Joseph Benjamin Castinado, North Glenn, CO (US); Brandon Ingram, Charlotte, NC (US); Naoll Addisu Merdassa, Chakopee, MN (US); Kevin Graham Robberts, Charlotte, NC (US); Ann Ta, Scottsdale, AZ (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 170 days.

This patent is subject to a terminal disclaimer.

(21) Appl. No.: 17/347,159

(22) Filed: Jun. 14, 2021

(65) Prior Publication Data
US 2022/0400010 A1 Dec. 15, 2022

(51) Int. Cl.
*H04L 9/32* (2006.01)
*H04L 9/14* (2006.01)

(52) U.S. Cl.
CPC .............. *H04L 9/3213* (2013.01); *H04L 9/14* (2013.01); *H04L 9/3231* (2013.01)

(58) Field of Classification Search
CPC ....... H04L 9/3213; H04L 9/14; H04L 9/3231; H04L 9/0866
See application file for complete search history.

(56) References Cited

U.S. PATENT DOCUMENTS

| | | | | |
|---|---|---|---|---|
| 6,970,853 B2* | 11/2005 | Schutzer | ............... | H04L 63/083 713/172 |
| 7,631,193 B1* | 12/2009 | Hoffman | ............... | H04L 9/3231 726/4 |
| 7,844,082 B2* | 11/2010 | Baentsch | ........... | G06V 40/1382 713/185 |
| 8,171,531 B2* | 5/2012 | Buer | ................... | H04W 12/069 380/278 |
| 8,739,266 B2 | 5/2014 | Buer | | |

(Continued)

*Primary Examiner* — J. Brant Murphy
(74) *Attorney, Agent, or Firm* — Moore & Van Allen PLLC; Gabrielle M. Carlini

(57) ABSTRACT

Embodiments of the invention are directed to systems, methods, and computer program products for generation of dynamic authentication tokens for use in system-to-system transaction authorization and user identity verification. The system utilizes user biometric data to generate unique authentication tokens which are customized to a particular user. Furthermore, the system rotates not only the encryption algorithms used, but also the datasets being encrypted in order to provide a high level of security such that even if a user's biometric data was compromised, it would be highly unlikely that an attacker would be able to recreate the authentication token stemming from said biometric data at any given point in time. The system eliminates the need for user-provided authentication credentials and provides a more secure and more efficient method of authenticating data exchange between multiple systems or applications.

20 Claims, 5 Drawing Sheets

(56) References Cited

U.S. PATENT DOCUMENTS

| | | | | |
|---|---|---|---|---|
| 8,769,655 B2* | 7/2014 | Gould | ............... | G06F 21/335 |
| | | | | 726/8 |
| 9,021,601 B2* | 4/2015 | Grange | ............... | H04L 9/16 |
| | | | | 726/9 |
| 9,594,968 B1* | 3/2017 | Hodgman | ............... | G06V 40/50 |
| 9,996,686 B2* | 6/2018 | Lau | ............... | H04L 63/0428 |
| 10,289,826 B2* | 5/2019 | Billings | ............... | G06F 21/34 |
| 10,541,813 B2* | 1/2020 | Jain | ............... | H04L 9/3226 |
| 10,824,702 B1* | 11/2020 | Shahidzadeh | ............... | G06F 21/604 |
| 10,931,673 B2* | 2/2021 | Chud | ............... | G06F 21/30 |
| 11,070,376 B2* | 7/2021 | Uy | ............... | H04L 9/3234 |
| 2003/0076961 A1* | 4/2003 | Kim | ............... | H04L 9/006 |
| | | | | 380/282 |
| 2005/0235148 A1* | 10/2005 | Scheidt | ............... | G06Q 20/3829 |
| | | | | 713/168 |
| 2006/0029261 A1* | 2/2006 | Hoffman | ............... | H04L 9/3226 |
| | | | | 382/115 |
| 2007/0094503 A1* | 4/2007 | Ramakrishna | ............... | H04L 63/062 |
| | | | | 713/172 |
| 2008/0313707 A1* | 12/2008 | Jain | ............... | H04L 63/08 |
| | | | | 380/255 |
| 2009/0293111 A1* | 11/2009 | Lai | ............... | G06F 21/32 |
| | | | | 713/186 |
| 2014/0189799 A1* | 7/2014 | Lu | ............... | H04L 63/102 |
| | | | | 726/4 |
| 2016/0173491 A1* | 6/2016 | Moten | ............... | H04L 63/108 |
| | | | | 726/4 |
| 2019/0268332 A1* | 8/2019 | Wang | ............... | G06F 21/32 |
| 2020/0184455 A1* | 6/2020 | Anantha | ............... | G06Q 20/3674 |
| 2020/0228335 A1* | 7/2020 | Pizano | ............... | H04L 9/3231 |
| 2021/0194874 A1* | 6/2021 | Herder, III | ............... | H04L 9/3231 |
| 2022/0114630 A1* | 4/2022 | Mamut | ............... | G06Q 30/0601 |

* cited by examiner

ELECTRONIC SYSTEM FOR GENERATION OF AUTHENTICATION TOKENS USING BIOMETRIC DATA

BACKGROUND

When a user wishes to exchange data between multiple systems or applications, a set of authentication credentials such as a username, password, or multi-factor authentication code is typically required, especially in scenarios related to the exchange of sensitive data. Said authentication credentials may be difficult to remember and highly labor intensive for a user to provide. Additionally, they are highly susceptible to being compromised in a data breach. As such, a need exists for a system which eliminates the need for user involvement in the authentication process by utilizing system-to-system authentication credential exchange.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for generation of authentication tokens, the invention comprising: receiving, from a user device associated with a user, a data transmission, where the data transmission includes a plurality of biometric datasets associated with the user; determining, via an encryption engine, a subset of the plurality of biometric datasets to be encrypted; applying, via the encryption engine, a plurality of encryption algorithms to each biometric dataset of the determined subset of biometric datasets; generating, via the encryption engine, an authentication token, where the authentication token is based on a set of results of the plurality of encryption algorithms; transmitting the authentication token to one or more third party systems and at least one of a managing entity system and the user device; and causing the authentication token to be stored by the one or more third party systems and the at least one of the managing entity system and the user device.

In some embodiments, the invention further comprises detecting, based on monitoring an application of the user device, a request for information exchange between the one or more third party systems and at least one of the user device and the managing entity system; causing the at least one of the user device and the managing entity system to transmit an authentication token stored at the at least one of the user device and the managing entity system to the one or more third party systems; causing the one or more third party systems to verify that the transmitted authentication token matches an authentication token stored at the one or more third party systems; and causing the one or more third party systems to authorize the request for data exchange.

In some embodiments, determining, via an encryption engine, a subset of the plurality of biometric datasets to be encrypted further includes randomly selecting the subset of the plurality of biometric datasets.

In some embodiments, applying, via the encryption engine, a plurality of encryption algorithms to each biometric dataset of the determined subset of biometric datasets further includes randomly selecting the plurality of encryption algorithms from a larger plurality of potential encryption algorithms.

In some embodiments, generating, via the encryption engine, an authentication token, wherein the authentication token is based on a set of results of the plurality of encryption algorithms, further includes concatenating the set of results of the plurality of encryptions algorithms into a single token.

In some embodiments, the invention further includes generating, after a predetermined amount of time, a new authentication token, where generation of the new authentication token includes: determining, via the encryption engine, a new subset of the plurality of biometric datasets to be encrypted by randomly selecting the new subset of the plurality of biometric datasets; applying, via the encryption engine, a new plurality of encryption algorithms to each biometric dataset of the new subset of biometric datasets by randomly selecting the new plurality of encryption algorithms from the larger plurality of potential encryption algorithms; and generating, via the encryption engine, a new authentication token, wherein the new authentication token is based on a set of results of the new plurality of encryption algorithms, by concatenating the set of results of the new plurality of encryptions algorithms into a single token; transmitting the new authentication token to one or more third party systems and at least one of a managing entity system and the user device; and causing the new authentication token to be stored by the one or more third party systems and the at least one of the managing entity system and the user device.

In some embodiments, the request for information exchange comprises a request to complete at least one of the following: log in to an account, view information of an account, complete a transaction, authorize a transaction, or transfer information between one or more systems.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
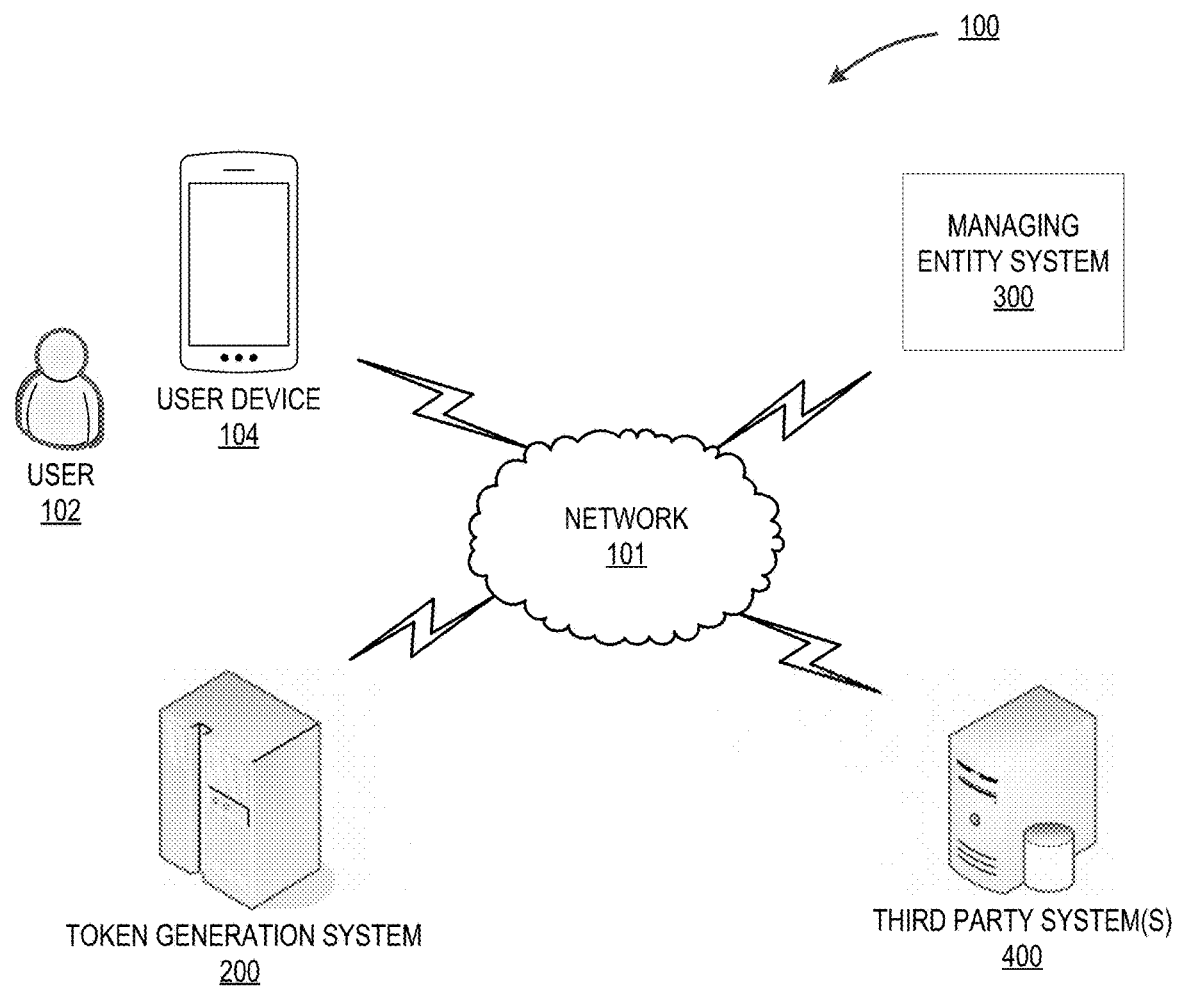
Figure 2:
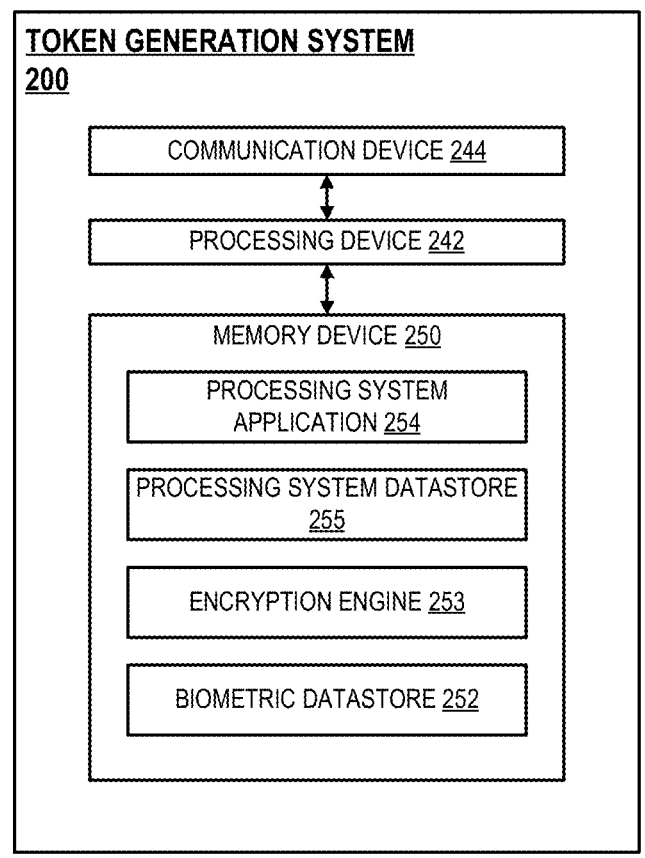
Figure 3:
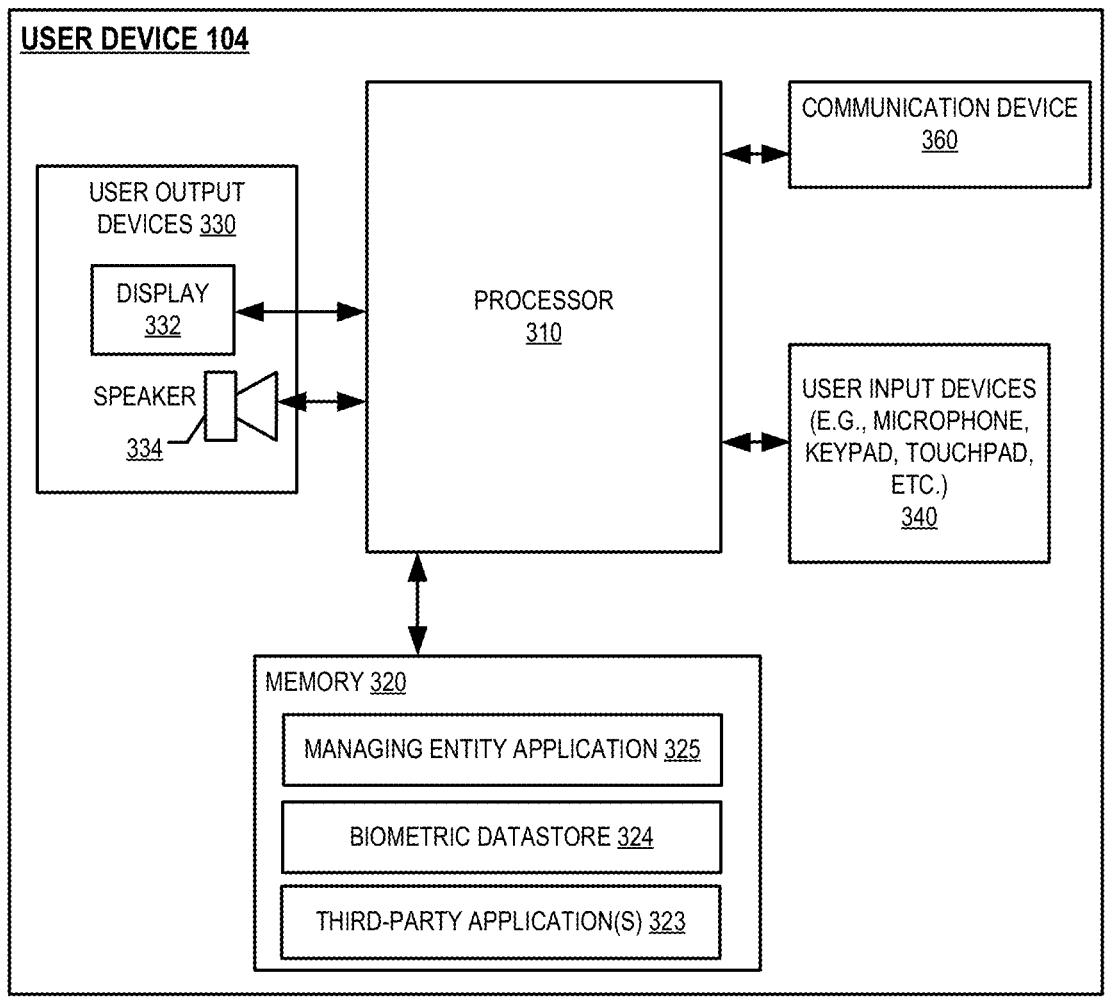
Figure 4:
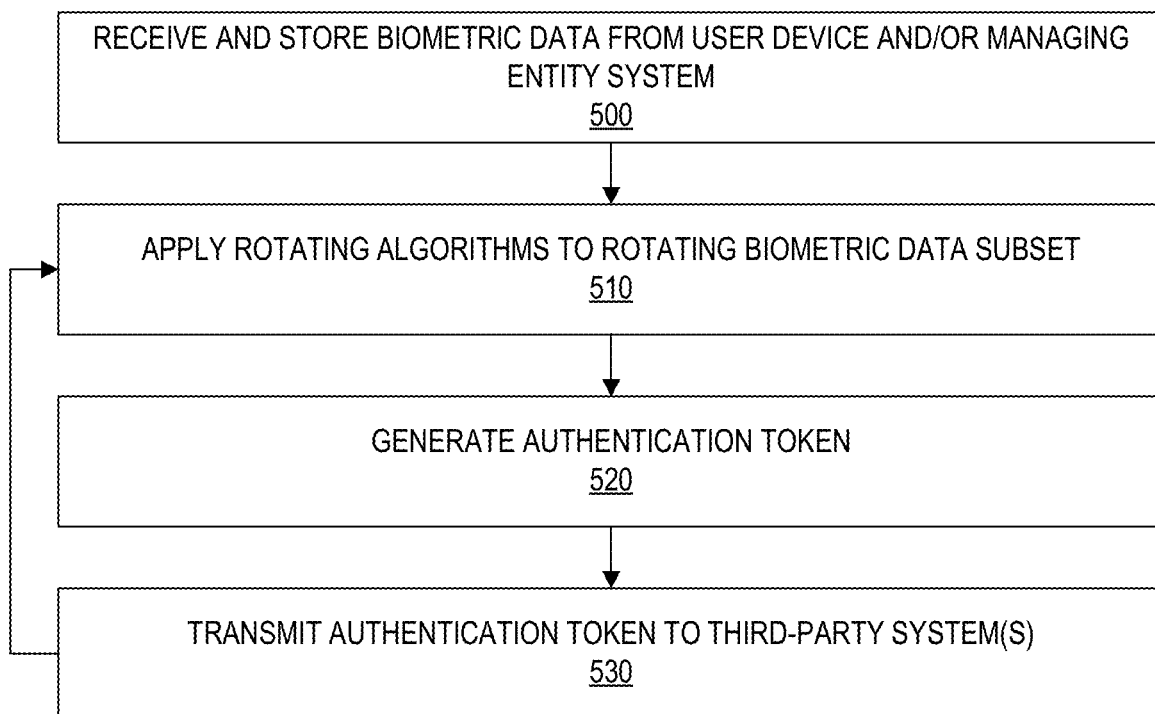
Figure 5:
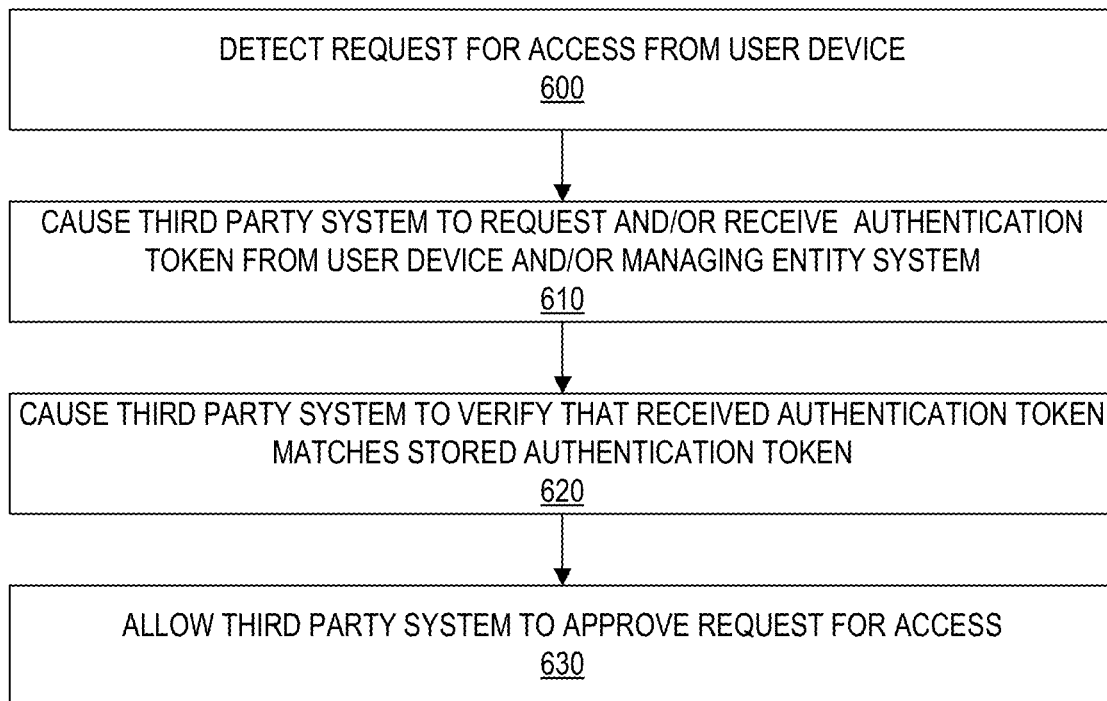

Having thus described embodiments of the invention in general terms, reference will now be made to the accompanying drawings, wherein:

FIG. 1 illustrates an operating environment for the token generation system, in accordance with one embodiment of the present disclosure;

FIG. 2 is a block diagram illustrating the token generation system;

FIG. 3 is a block diagram illustrating a user device associated with the token generation system;

FIG. 4 is a flow diagram illustrating a process using the token generation system, in accordance with one embodiment of the present disclosure; and FIG. 5 is a flow diagram illustrating a process using the token generation system, in accordance with another embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a computer terminal, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and computer terminals described herein. In other embodiments, a user may be a system or an entity performing one or more tasks described herein.

Accordingly, as used herein the term "user device" or "mobile device" may refer to mobile phones, personal computing devices, tablet computers, wearable devices, and/or any portable electronic device capable of receiving and/or storing data therein.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

"Engine" as used herein may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to teach other with one or more components located between the components that are operatively coupled together. Furthermore, "operatively coupled" may mean that the components are detachable from each other, or that they are permanently coupled together. Furthermore, "operatively coupled" may mean that components may be electronically connected.

The system described herein provides a dynamically generated authentication token for system-to-system transaction authentication and user verification. The system provides the functional benefit of eliminating the need for user-provided authentication credentials, which are not only difficult for a user to remember but are often highly susceptible to becoming compromised in a data breach. Furthermore, the system utilizes user biometric data to generate said authentication tokens which provides of the benefit of ensuring that each token is truly unique to a particular user. Overall, the system provides a more secure and more efficient method of authenticating data exchange between multiple systems or applications.

FIG. 1 illustrates an operating environment 100 for the token generation system, in accordance with one embodiment of the present disclosure. As illustrated, the system environment 100 may comprise a user device 104 in operative communication with one or more third party systems 400 via a network 101. The system environment also includes a user 102, a managing entity system 300, a token generation system 200, and/or other systems/devices not illustrated herein and connected via a network 101. As such, the user device 104 is configured such that the user 102 may access, log in to, and/or communicate with the third party system(s) 400 by establishing operative communication channels between the user device 104, the managing entity system 300, and the third party system(s) 400 via a wireless network.

Typically, the token generation system 200 is in operative communication with the managing entity system 400, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system(s) 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, entertainment devices, laptop computers, cameras, video recorders, audio/video player, radio, GPS devices, any combination of the aforementioned, or the like. The user device is described in greater detail with respect to FIG. 3.

The managing entity system 300 may comprise a communication module and memory not illustrated and may be configured to establish operative communication channels with the third party system(s) 400 and a user device 104 via a network 101. The managing entity may comprise a user data repository which stores user account and/or user biometric data. This data may be used by the managing entity to authenticate communications between the user device 104 and the third party system(s) 400. In some embodiments, the managing entity system is in operative communication with the token generation system 200 via a private communication channel. The private communication channel may be via a network 101 or the token generation system 200 may be fully integrated within the managing entity system 400.

As will be discussed in greater detail in FIG. 4 and FIG. 5, the one or more third party system(s) 400 may communicate with the token generation system 200 in order to authenticate a user's identify, verify a transfer request, and/or otherwise validate a communication between a user device and/or the managing entity system. In some embodiments, the token generation system 200 may regularly provide the user device 104, managing entity system 300, and third party systems 400 with newly generated authentication tokens which may be used to validate the identity of a user without the need for additional user input to the user device 104.

FIG. 2 illustrates a block diagram of the token generation system 200 associated with the operating environment 100, in accordance with embodiments of the present invention. As illustrated in FIG. 2, the token generation system 200 may include a communication device 244, a processing device 242, and a memory device 250 having a biometric datastore 252, an encryption engine 253, a processing system application 254 and a processing system datastore 255 stored therein. As shown, the processing device 242 is operatively connected to and is configured to control and cause the communication device 244, and the memory device 250 to perform one or more functions. In some embodiments, the encryption engine 253 and/or the processing system application 254 comprises computer readable instructions that when executed by the processing device 242 cause the processing device 242 to perform one or more functions and/or transmit control instructions to the managing entity system 300, the third party system(s) 400, and/or the communication device 244. It will be understood that the encryption engine 253 and/or the processing system application 254 may be executable to initiate, perform, complete, and/or facilitate one or more portions of any embodiments described and/or contemplated herein, and specifically embodiments directed to generation of encrypted authentication tokens. The encryption engine 253 may comprise executable instructions associated with generation and encryption of authentication tokens, and may be embodied within the processing system application 254 in some instances. The token generation system 200 may be owned by, operated by and/or affiliated with the same managing entity that owns or operates the managing entity system 300. In some embodiments, the token generation system 200 is fully integrated within the managing entity system 300.

The communication device 244 may generally include a modem, server, transceiver, and/or other devices for communicating with other devices on the network 101. The network communication device 244 may be a communication interface having one or more communication devices configured to communicate with one or more other devices on the network 101, such as the token generation system 200, the user device 104, other processing systems, data systems, etc.

Additionally, referring to the token generation system 200 illustrated in FIG. 2, the processing device 242 may generally refer to a device or combination of devices having circuitry used for implementing the communication and/or logic functions of the token generation system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the system 200 may be allocated between these processing devices according to their respective capabilities. The processing device 242 may further include functionality to operate one or more software programs based on computer-executable program code thereof, which may be stored in a memory device 250, such as the processing system application 254 and the encryption engine 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the token generation system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

FIG. 3 illustrates a block diagram of the user device associated with the token generation operating environment 100, in accordance with embodiments of the present invention. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, entertainment devices, laptop computers, cameras, video recorders, audio/video player, radio, GPS devices, any combination of the aforementioned devices.

The mobile device 104 may generally include a processing device or processor 310 communicably coupled to devices such as, a memory device 320, user output devices 330 (for example, a user display device 332, or a speaker 334), user input devices 340 (such as a microphone, keypad, touchpad, touch screen, fingerprint scanner, camera, and/or the like), a communication device or network interface device 360, one or more chips, and the like.

The processor 310 may include functionality to operate one or more software programs or applications, which may be stored in the memory device 320. For example, the processor 310 may be capable of operating applications such as the managing entity application 325, one or more third party applications 323, a biometric datastore 324, or a web browser application. The managing entity application 325 may then allow the mobile device 104 to transmit and receive data and instructions to or from the managing entity system 300 (for example, via wireless communication or NFC channels), data and instructions to or from the processing system 200, web content, such as, for example, location-based content and/or other web page content, according to a Wireless Application Protocol (WAP), Hypertext Transfer Protocol (HTTP), and/or the like.

The processor 310 may be configured to use the communication device 360 to communicate with one or more other devices on a network 101 such as, but not limited to the managing entity system 300 and the token generation system 200. The processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The communication device 360 may also include a user activity interface presented in user output devices 330 in order to allow a user 102 to execute some or all of processes described herein. Furthermore, the application interface may have the ability to connect to and communicate with an external data storage on a separate system within the network 101. As described above, the mobile device 104 includes a user interface that includes user output devices 330 and/or user input devices 340. The user output devices 330 may include a display 332 (e.g., a liquid crystal display (LCD) or the like) and a speaker 334 or other audio device, which are operatively coupled to the processor 310. The user input devices 340, which may allow the mobile device 104 to receive data from the user 102, may include any of a number of devices allowing the mobile device 104 to receive data from a user 102, such as a keypad, keyboard, touch-screen, touchpad, microphone, mouse, joystick, other pointer device, button, soft key, and/or other input device(s).

The mobile device 104 may also include a memory buffer, cache memory or temporary memory device operatively coupled to the processor 310. Typically, one or more applications 325, 324, and 323, are loaded into the temporary memory during use. As used herein, memory may include any computer readable medium configured to store data, code, or other information. The memory device 320 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the token generation system 200 performing one or more steps described herein in conjunction with other devices and systems, either automatically based on executing computer readable instructions of the memory device 250, or in response to receiving control instructions from the managing entity system 400. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a high-level process flow diagram illustrating a process using the token generation system 200, in accordance with one embodiment of the present disclosure. The process begins at block 500, wherein in some embodiments, the system receives a data transmission from a user device 104. The data transmission may comprise a plurality of biometric datasets of a user 102 associated with the user device 104 and may further comprise any type of biometric data obtained from a user input device 340 such as a fingerprint, facial scan, iris scan, voice sample, and/or the like. Additionally or alternatively, the system may receive a data transmission from a managing entity system 300, wherein the data transmission comprises biometric data of a user 102. After receipt of the data transmission, the system may store the biometric datasets of the user 102 in a biometric datastore 252.

The process may then continue to block 510, wherein the system applies, via an encryption engine 253, a series of encryption algorithms to a subset of the biometric data associated with a user 102. The encryption algorithms may be dynamic, rotating algorithms such that at any given point in time, the subset of biometric data used as well as the types of algorithms applied to each dataset in the subset may vary. In an exemplary embodiment, the encryption engine 253 may be configured to apply one hundred different encryption algorithms numbered 1-100 to any given dataset. In the same exemplary embodiment, the biometric data associated with a user may comprise a dataset characterizing a right thumbprint, a left thumbprint, a voice sample, and a facial scan. The encryption engine 253 may then shuffle, or randomly rotate, the encryption algorithms applied to said data. Therefore, at one given point in time, the encryption engine may apply algorithms 1, 10, and 20 to the dataset characterizing the left thumbprint, apply algorithms 45, 2, and 68 to the dataset characterizing the voice sample, and finally apply algorithms 3, 97, and 23 to the dataset characterizing the right thumbprint. The results of said series of algorithms may then be strung together or concatenated to generate a unique authentication token as illustrated by block 520 of the process flow. By rotating both the encryption algorithms used, as well as the pieces of data being encrypted, the system provides a high level of security such that even if a user's biometric data was compromised, it would be highly unlikely that an attacker would be able to recreate the authentication token stemming from said biometric data at any given point in time.

The process may then continue to block 530, wherein the system transmits the generated authentication token and information identifying the user 102 associated with the authentication token to one or more third party systems 400, the user device 104, and/or the managing entity system 300 for storage. The transmitted authentication token may then be used for user identity verification or transaction authentication as is discussed in greater detail with respect to FIG. 5. In some embodiments, the process may repeat beginning at block 510 after a predetermined period of time (e.g. one day, one hour, ten minutes, or the like) in order to provide the recipients of the authentication tokens with newly generated tokens at regular intervals. To increase the overall security of the process, in some embodiments, the time intervals between new token generations may be randomly varied by the encryption engine 253.

FIG. 5 is a high-level process flow diagram illustrating a process using the token generation system, in accordance with another embodiment of the present disclosure. The process begins at block 600, wherein the system monitors the managing entity application 325 and/or one or more third-party applications 323 of the user device 104 and detects a request by the user 102 for access and/or information exchange between the user device 104, the managing entity system 300, and one or more third-party systems 400. The request for access may comprise a request to log into an account, view account information, and/or the like. The request for information exchange may comprise a transaction request, authorization request, a request for user or account information to be transferred between the managing entity system 300 and a third-party system 400, and/or the like. In some embodiments, the request for access and/or information exchange may further comprise a set of user authentication credentials such as a username and/or password. In some embodiments, the token generation system may serve as the only user authentication necessary to approve the request.

The process may then continue to block 610, wherein in some embodiments, the system causes the user device 104 and/or the managing entity system 300 to transmit the stored authentication token associated with the user 102 to the third party system 400. Additionally or alternatively, the system may cause the third party system 400 to send a request to the user device 104 and/or the managing entity system for a stored authentication token associated with the user 102. The stored authentication token may be the authentication token which was most recently generated by the system, as is discussed in greater detail with respect to FIG. 4.

The process may then continue to block 620, wherein the system causes the third party system 400 to compare the authentication token received by the user device 104 or the managing entity system 300 to the authentication token stored by the third party system (i.e. the most recently generated authentication token). If the received authentication token matches the stored authentication token, the system may allow the third-party system 400 to approve or authorize the request for access and/or information exchange, as illustrated by block 630.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generation of authentication tokens, the system comprising:
   a memory device with computer-readable program code stored thereon;
   a communication device;
   a processing device operatively coupled to the memory device and the communication device, wherein the processing device is configured to execute the computer-readable program code to:
   receive, from a user device associated with a user, a data transmission, wherein the data transmission comprises a plurality of biometric datasets associated with the user;
   determine, via an encryption engine, a subset of the plurality of biometric datasets to be encrypted;
   apply, via the encryption engine, a plurality of encryption algorithms to each biometric dataset of the determined subset of biometric datasets;
   generate, via the encryption engine, an authentication token, wherein the authentication token is based on a set of results of the plurality of encryption algorithms;
   transmit the authentication token to one or more third party systems and at least one of a managing entity system and the user device; and
   cause the authentication token to be stored by the one or more third party systems and the at least one of the managing entity system and the user device.

2. The system of claim 1, wherein the processing device is further configured to execute the computer-readable program code to:
   detect, based on monitoring an application of the user device, a request for information exchange between the one or more third party systems and at least one of the user device and the managing entity system;

cause the at least one of the user device and the managing entity system to transmit an authentication token stored at the at least one of the user device and the managing entity system to the one or more third party systems;
cause the one or more third party systems to verify that the transmitted authentication token matches an authentication token stored at the one or more third party systems; and
cause the one or more third party systems to authorize the request for data exchange.

3. The system of claim 1, wherein determining, via an encryption engine, a subset of the plurality of biometric datasets to be encrypted further comprises randomly selecting the subset of the plurality of biometric datasets.

4. The system of claim 1, wherein applying, via the encryption engine, a plurality of encryption algorithms to each biometric dataset of the determined subset of biometric datasets further comprises randomly selecting the plurality of encryption algorithms from a larger plurality of potential encryption algorithms.

5. The system of claim 1, wherein generating, via the encryption engine, an authentication token, wherein the authentication token is based on a set of results of the plurality of encryption algorithms, further comprises concatenating the set of results of the plurality of encryptions algorithms into a single token.

6. The system of claim 1, wherein the at least processing device is further configured to execute the computer-readable program code to:
generate, after a predetermined amount of time, a new authentication token, wherein generation of the new authentication token comprises:
determining, via the encryption engine, a new subset of the plurality of biometric datasets to be encrypted by randomly selecting the new subset of the plurality of biometric datasets;
applying, via the encryption engine, a new plurality of encryption algorithms to each biometric dataset of the new subset of biometric datasets by randomly selecting the new plurality of encryption algorithms from the larger plurality of potential encryption algorithms; and
generating, via the encryption engine, a new authentication token, wherein the new authentication token is based on a set of results of the new plurality of encryption algorithms, by concatenating the set of results of the new plurality of encryptions algorithms into a single token;
transmit the new authentication token to one or more third party systems and at least one of a managing entity system and the user device; and
cause the new authentication token to be stored by the one or more third party systems and the at least one of the managing entity system and the user device.

7. The system of claim 2, wherein the request for information exchange comprises a request to complete at least one of the following: log in to an account, view information of an account, complete a transaction, authorize a transaction, or transfer information between one or more systems.

8. A computer program product for generation of authentication tokens with at least one non-transitory computer-readable medium having computer-readable program code portions embodied therein, the computer-readable program code portions comprising:
an executable portion configured for receiving, from a user device associated with a user, a data transmission, wherein the data transmission comprises a plurality of biometric datasets associated with the user;
an executable portion configured for determining, via an encryption engine, a subset of the plurality of biometric datasets to be encrypted;
an executable portion configured for applying, via the encryption engine, a plurality of encryption algorithms to each biometric dataset of the determined subset of biometric datasets;
an executable portion configured for generating, via the encryption engine, an authentication token, wherein the authentication token is based on a set of results of the plurality of encryption algorithms;
an executable portion configured for transmitting the authentication token to one or more third party systems and at least one of a managing entity system and the user device; and
an executable portion configured for causing the authentication token to be stored by the one or more third party systems and the at least one of the managing entity system and the user device.

9. The computer program product of claim 8, further comprising:
an executable portion configured for detecting, based on monitoring an application of the user device, a request for information exchange between the one or more third party systems and at least one of the user device and the managing entity system;
an executable portion configured for causing the at least one of the user device and the managing entity system to transmit an authentication token stored at the at least one of the user device and the managing entity system to the one or more third party systems;
an executable portion configured for causing the one or more third party systems to verify that the transmitted authentication token matches an authentication token stored at the one or more third party systems; and
an executable portion configured for causing the one or more third party systems to authorize the request for data exchange.

10. The computer program product of claim 8, wherein determining, via an encryption engine, a subset of the plurality of biometric datasets to be encrypted further comprises randomly selecting the subset of the plurality of biometric datasets.

11. The computer program product of claim 8, wherein applying, via the encryption engine, a plurality of encryption algorithms to each biometric dataset of the determined subset of biometric datasets further comprises randomly selecting the plurality of encryption algorithms from a larger plurality of potential encryption algorithms.

12. The computer program product of claim 8, wherein generating, via the encryption engine, an authentication token, wherein the authentication token is based on a set of results of the plurality of encryption algorithms, further comprises concatenating the set of results of the plurality of encryptions algorithms into a single token.

13. The computer program product of claim 8, further comprising:
an executable portion configured to generate, after a predetermined amount of time, a new authentication token, wherein generation of the new authentication token comprises:
determining, via the encryption engine, a new subset of the plurality of biometric datasets to be encrypted by randomly selecting the new subset of the plurality of biometric datasets;

applying, via the encryption engine, a new plurality of encryption algorithms to each biometric dataset of the new subset of biometric datasets by randomly selecting the new plurality of encryption algorithms from the larger plurality of potential encryption algorithms; and generating, via the encryption engine, a new authentication token, wherein the new authentication token is based on a set of results of the new plurality of encryption algorithms, by concatenating the set of results of the new plurality of encryptions algorithms into a single token;

an executable portion configured to transmit the new authentication token to one or more third party systems and at least one of a managing entity system and the user device; and an executable portion configured to cause the new authentication token to be stored by the one or more third party systems and the at least one of the managing entity system and the user device.

14. The computer program product of claim 9, wherein the request for information exchange comprises a request to complete at least one of the following: log in to an account, view information of an account, complete a transaction, authorize a transaction, or transfer information between one or more systems.

15. A computer-implemented method for protection of network-based resource transfers, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving, from a user device associated with a user, a data transmission, wherein the data transmission comprises a plurality of biometric datasets associated with the user;
determining, via an encryption engine, a subset of the plurality of biometric datasets to be encrypted;
applying, via the encryption engine, a plurality of encryption algorithms to each biometric dataset of the determined subset of biometric datasets;
generating, via the encryption engine, an authentication token, wherein the authentication token is based on a set of results of the plurality of encryption algorithms;
transmitting the authentication token to one or more third party systems and at least one of a managing entity system and the user device; and
causing the authentication token to be stored by the one or more third party systems and the at least one of the managing entity system and the user device.

16. The computer-implemented method of claim 15, wherein the computer processing device performs the further operations of:
detecting, based on monitoring an application of the user device, a request for information exchange between the one or more third party systems and at least one of the user device and the managing entity system;
causing the at least one of the user device and the managing entity system to transmit an authentication token stored at the at least one of the user device and the managing entity system to the one or more third party systems;
causing the one or more third party systems to verify that the transmitted authentication token matches an authentication token stored at the one or more third party systems; and
causing the one or more third party systems to authorize the request for data exchange.

17. The computer-implemented method of claim 15, wherein determining, via an encryption engine, a subset of the plurality of biometric datasets to be encrypted further comprises randomly selecting the subset of the plurality of biometric datasets.

18. The computer-implemented method of claim 15, wherein applying, via the encryption engine, a plurality of encryption algorithms to each biometric dataset of the determined subset of biometric datasets further comprises randomly selecting the plurality of encryption algorithms from a larger plurality of potential encryption algorithms.

19. The computer-implemented method of claim 15, wherein generating, via the encryption engine, an authentication token, wherein the authentication token is based on a set of results of the plurality of encryption algorithms, further comprises concatenating the set of results of the plurality of encryptions algorithms into a single token.

20. The computer-implemented method of claim 16, wherein the computer processing device performs the further operations of:
generating, after a predetermined amount of time, a new authentication token, wherein generation of the new authentication token comprises:
determining, via the encryption engine, a new subset of the plurality of biometric datasets to be encrypted by randomly selecting the new subset of the plurality of biometric datasets;
applying, via the encryption engine, a new plurality of encryption algorithms to each biometric dataset of the new subset of biometric datasets by randomly selecting the new plurality of encryption algorithms from the larger plurality of potential encryption algorithms; and
generating, via the encryption engine, a new authentication token, wherein the new authentication token is based on a set of results of the new plurality of encryption algorithms, by concatenating the set of results of the new plurality of encryptions algorithms into a single token;
transmitting the new authentication token to one or more third party systems and at least one of a managing entity system and the user device; and
causing the new authentication token to be stored by the one or more third party systems and the at least one of the managing entity system and the user device.

\* \* \* \* \*